US011057127B2

(12) United States Patent
Meiman et al.

(10) Patent No.: US 11,057,127 B2
(45) Date of Patent: Jul. 6, 2021

(54) METHOD AND SYSTEM FOR IDENTIFYING TRANSMITTER USAGE CHARACTERISTICS

(71) Applicant: ELBIT SYSTEMS BMD AND LAND EW-ELISRA LTD., Holon (IL)

(72) Inventors: Yehouda Meiman, Holon (IL); Elior Hadad, Holon (IL); Etay Weiss, Holon (IL)

(73) Assignee: Elbit Systems BMD and Land EW-Elisra Ltd.

( * ) Notice: Subject to any disclaimer, the term of this patent is extended or adjusted under 35 U.S.C. 154(b) by 0 days.

(21) Appl. No.: 16/621,849

(22) PCT Filed: Jun. 7, 2018

(86) PCT No.: PCT/IL2018/050622
§ 371 (c)(1),
(2) Date: Dec. 12, 2019

(87) PCT Pub. No.: WO2018/229749
PCT Pub. Date: Dec. 20, 2018

(65) Prior Publication Data
US 2020/0287635 A1      Sep. 10, 2020

(30) Foreign Application Priority Data

Jun. 12, 2017   (IL) .......................................... 252861

(51) Int. Cl.
*H04B 17/27*   (2015.01)
*H01Q 25/00*   (2006.01)
(Continued)

(52) U.S. Cl.
CPC ............ *H04B 17/27* (2015.01); *G01S 5/0036* (2013.01); *H01Q 25/001* (2013.01); *H04B 17/101* (2015.01)

(58) Field of Classification Search
CPC ...... H04B 17/27; H04B 17/101; H04B 17/10; H04B 17/102; H04B 17/103;
(Continued)

(56) References Cited

U.S. PATENT DOCUMENTS 5,486,833 A   1/1996  Barrett
5,608,411 A   3/1997  Rose
(Continued)

FOREIGN PATENT DOCUMENTS

EP    2426508 A2    3/2012
WO    2011114189 A1    9/2011

OTHER PUBLICATIONS

Jimmy Lomin et al. "Novel Vector Sensors Design with Three Co-located or Distributed Elements for the 3D DoA Estimation" Progress in Electromagnetics Research B, vol. 57, 207{220, 2014}.
(Continued)

*Primary Examiner* — Ian N Moore
*Assistant Examiner* — Brian T Le
(74) *Attorney, Agent, or Firm* — Conley Rose, P.C.

(57) ABSTRACT

A method for identifying transmitter usage characteristics of at least one transmitter. The method includes the procedures of receiving by an array of dual polarized antennas, transmissions from a plurality of transmitters. Each one of the transmitters transmits over the same frequency band and according to the same transmission protocol. Each one of the transmitters is associated with unique multi-access information. The method further includes the procedure of receiving a control transmission from a base station. The base station employs the protocol. The control transmission at least includes a plurality of unique multi-access information respective of the transmitters. The method also includes the procedure of associating between each one of the transmitters and the respective multi-access information and identifying transmitter usage characteristics of at least one selected transmitter according to the received transmission therefrom. The transmitter usage characteristics include transmitter location characteristics and transmission characteristics.

5 Claims, 3 Drawing Sheets

(51) Int. Cl.
*G01S 5/00* (2006.01)
*H04B 17/10* (2015.01)

(58) Field of Classification Search
CPC ...... H04B 17/104; H04B 17/20; H04B 17/02;
H04B 17/11–21; H04B 17/23–24; H04B
17/26–27; H04B 17/29; G01S 5/0036;
G01S 5/0027; G01S 5/0018; G01S 5/02;
G01S 3/14; G01S 5/0045; G01S 5/0054;
G01S 5/0063; H01Q 25/001; H01Q
25/00; H01Q 1/28; H04W 64/00
See application file for complete search history.

(56) References Cited

U.S. PATENT DOCUMENTS

| | | | |
|---|---|---|---|
| 6,266,013 | B1 | 7/2001 | Stilp et al. |
| 6,782,264 | B2 | 8/2004 | Anderson |
| 8,311,509 | B2 | 11/2012 | Feher |
| 8,542,145 | B2 | 9/2013 | Galati |
| 9,513,361 | B1 | 12/2016 | Elsallal et al. |
| 2005/0195103 | A1 | 9/2005 | Davis et al. |
| 2006/0262011 | A1 | 11/2006 | Bull et al. |
| 2011/0304508 | A1 | 12/2011 | Remez et al. |
| 2014/0003262 | A1 | 1/2014 | He et al. |
| 2014/0099914 | A1 | 4/2014 | Ngai |
| 2016/0205508 | A1 | 7/2016 | Sanderovich |

OTHER PUBLICATIONS

Larry L. Horowitz, "Airborne Signal Intercept for Wide-Area Battlefield Surveillance" vol. 10, No. 2, 1997, The Lincoln Laboratory Journal.

Feng Luo et al. "Enhanced "vector-cross-product" direction-finding using a constrained sparse triangular-array" Luo and Yuan EURASIP Journal on Advances in Signal Processing 2012, 2012:115 http://asp.eurasipjournals.com/content/2012/1/115.

Fabian van den Broek, "Catching and Understanding GSM-Signals"; Master's Thesis Computer Science, Radboud University Nijmegen.

Extended European Search Report dated Feb. 15, 2021, for corresponding Application No. 18816699.5 (5p.).

METHOD AND SYSTEM FOR IDENTIFYING TRANSMITTER USAGE CHARACTERISTICS

CROSS-REFERENCE TO RELATED APPLICATIONS

This application is a 35 U.S.C. § 371 national stage application of PCT/IL2018/050622 filed Jun. 7, 2018, and entitled "Method and System for Identifying Transmitter Usage Characteristics," which claims priority to Application No. IL 252861 filed Jun. 12, 2017, both of which are incorporated herein by reference in their entirety.

FIELD OF THE DISCLOSED TECHNIQUE

The disclosed technique relates to transmission detection in general, and to methods and systems for determining transmitter usage characteristics, in particular.

BACKGROUND OF THE DISCLOSED TECHNIQUE

Known in the art are methods and system for tracking the location of mobile devices (e.g., cellular phones, portable computers, Personal Digital Assistance—PDA). Such systems and methods employ techniques, such as Interferometry, Time Difference Of Arrival (TDOA), Poynting vector and the like. Applications for tracking mobile stations include, for example, location of users during an emergency (e.g., earthquake, floods and the like) as well as for improving Signal to Noise Ratio (SNR), for example, by directing a transmitting or receiving beam toward the mobile device. Also known in the art are system and methods for monitoring call information (e.g., for law enforcement agencies) mobile device by monitoring the backhaul of network (e.g., cellular network) of the mobile device. The call information is for example frequency, and caller information, control and traffic channel assignment, called number, mobile identification number and the like.

U.S. Pat. No. 6,782,264 to Anderson entitled "Monitoring of Call Information in a Wireless Location System" directs to systems and methods for collecting wireless call associated information using a non-invasive, passive mechanism. The system and method directed to by Anderson determines cell, frequency, and caller information as well as control and traffic channel assignment, called number, and mobile identification for the purpose of directing a Wireless Location System by passively monitoring an Abis interface of the mobile network.

U.S. Patent Application Publication 2014/0003262 to He et al, entitled "Sounding Reference Signal (SRS) Mechanism for Intercell Device-To-Device (D2D) Communication" directs to a protocol for discovering devices for D2D communications in a cell of a cellular network. In the protocol directed to by HE, user equipment is configured for device discovery via a base station using the D2D sounding reference signal (SRS), employing a transceiver module. The transceiver module sends a radio resource control (RRC) device discovery request to the base station, scans D2D SRS subframes for other UEs in proximity thereto using D2D SRS triggering. The transceiver module further sends feedback to the base station of detected D2D SRS information of the other modules in proximity thereto in the same cell thereof.

U.S. Pat. No. 5,608,411 to Rose, entitled "Apparatus for Measuring a Spatial Angle to an Emitter Using Squinted Antennas" directs to an apparatus for determining the direction of arrival or angle of arrival of an RF signal, from the phase measurements made between two antennas. The apparatus directed to by Rose employs a pair of dual polarized antennas having non-parallel boresights. Like polarized outputs from the antennas produce phase information, which is summed to remove bias error in favor of the angle of arrival component. The phase information from the like polarized antennas is subtracted producing a signal indicative of the bias error. The bias error is related to emitter angle and azimuth.

SUMMARY OF THE PRESENT DISCLOSED TECHNIQUE

It is an object of the disclosed technique to provide a novel method and system for identifying transmitter usage characteristics of at least one transmitter.

In accordance with the disclosed technique, there is thus provided a method for identifying transmitter usage characteristics of at least one transmitter. The method includes the procedures of receiving by an array of dual polarized antennas, transmissions from a plurality of transmitters. Each one of the transmitters transmits over the same frequency band and according to the same transmission protocol. Each one of the transmitters is associated with unique multi-access information. The method further includes the procedure of receiving a control transmission from a base station. The base station employs the protocol. The control transmission at least includes a plurality of unique multi-access information respective of the transmitters. The method also includes the procedure of associating between each one of the transmitters and the respective multi-access information and identifying transmitter usage characteristics of at least one selected transmitter according to the received transmission therefrom. The transmitter usage characteristics include transmitter location characteristics and transmission characteristics.

In accordance with another aspect of the disclosed technique, there is thus provided system for identifying transmitter usage characteristics of at least one transmitter. The system includes an antenna array which includes a plurality of dual polarized antennas, a reference antenna, a plurality of receivers, a reference receiver and a processor. Each of the plurality of receivers is coupled with a respective dual polarized antenna. The reference receiver is coupled with the reference antenna. The processor is coupled with each one of the plurality of receivers and with the reference receiver. Each antenna receives signals transmitted by a plurality of transmitters. Each one of the transmitters transmits over the same frequency band and according to the same transmission protocol. Each one of the transmitters is associated with unique multi-access information. The reference antenna receives a signal from a base station. The base station employs the protocol. The signal from the base station includes a control transmission. The control transmission includes the unique multi-access information respective of the transmitters. Each of the receivers receives a respective electric received signal from the respective dual polarized antenna a produces a respective sampled received signal. The reference receiver receives from the reference antenna the reference electric received signal from the reference antenna and produces a sampled reference received signal. The processor receives the sampled reference received signal from the reference receiver and a plurality of sampled received signals from the receivers. The processor determines multi-access information respective of each of the transmitters from the sampled reference received signal. The processor associates between each one of the transmitters and the respective multi-access allocation information. The processor further identifies transmitter usage characteristics of at least one selected transmitter according to the received transmission therefrom. The transmitter usage characteristics include transmitter location characteristics and transmission characteristics.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and a method for detecting transmission of selected ones of a plurality of transmitters in general, and for identifying transmitter usage characteristics of these selected transmitters in particular. The transmitter usage characteristics include, for example, transmitter location characteristics and transmission characteristics. Transmission characteristics relate to the start transmission time, to the transmission end time and may further relate to transmission duration, and the volume of transmitted data (e.g., measured in bytes). The term transmitter location characteristics is further explained herein below in conjunction with FIGS. 1A and 1B.

Figure 1A:
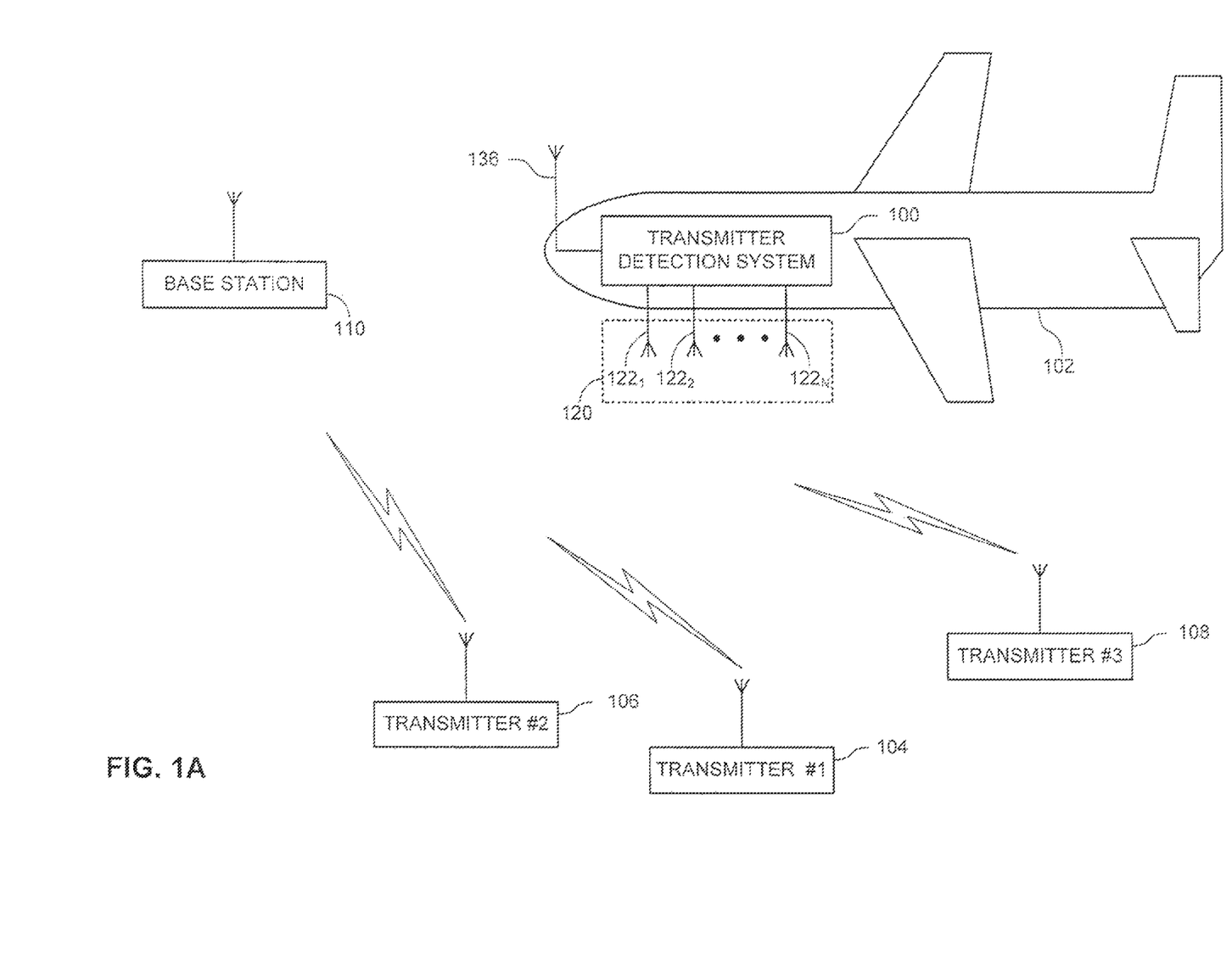
FIGS. 1A and 1B are schematic illustrations of a system for identifying transmitter usage characteristics, constructed and operative in accordance with an embodiment of the disclosed technique.
Figure 1B:
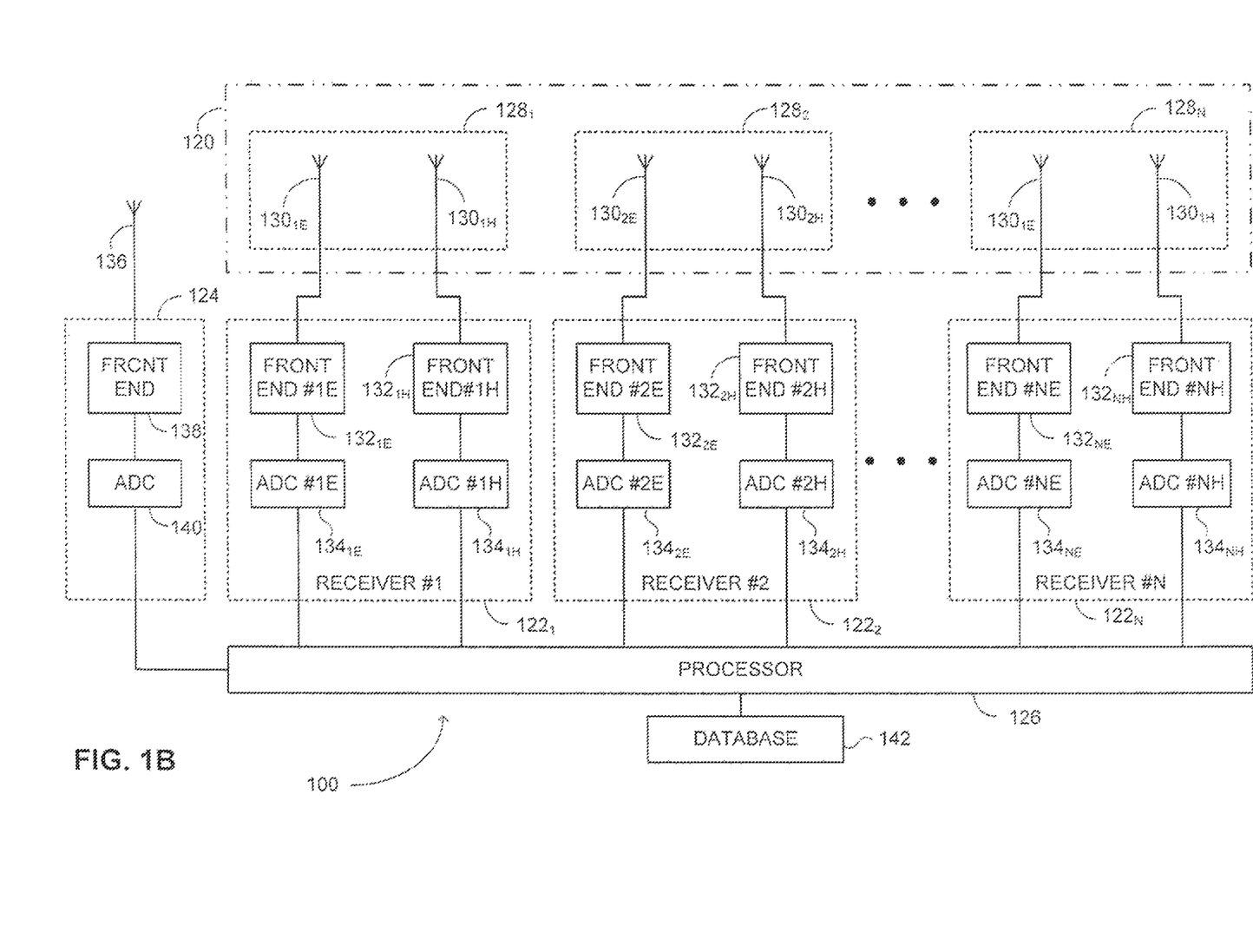

Reference is now made to FIGS. 1A and 1B, which are schematic illustrations of a system, generally referenced 100, for identifying transmitter usage characteristics, constructed and operative in accordance with an embodiment of the disclosed technique. System 100 is located, for example, on a vehicle 102 such as aircraft and aims to detect transmitters, such as transmitters 104, 106 and 108, which transmit over the same bandwidth simultaneously according to the same transmission protocol. Transmitters 104, 106 and 108 are part of a wireless network such as a cellular network, a WiFi network a WiMax network and communicate (i.e., transmit and receive) information via base station 110 (e.g., a cellular base station or a WiFi router, wireless access point). Base station 110 may be a mobile base station or a stationary base station. The term 'base station' herein relates herein to a transceiver providing wireless devices with access to a network. For convenience, the remainder of the description shall refer to the cellular example.

The term 'location characteristics' relates herein to the direction (i.e., either azimuth, elevation or both) of transmitters 104, 106 and 108 relative to vehicle 102. The term location characteristics may further relate herein to the location of transmitters 104, 106 and 108 relative to vehicle 102 (e.g., the azimuth the elevation and the distance relative to vehicle 102) or to the location of transmitters 104, 106 and 108 in a reference coordinate system (e.g., WSG84, ETRS89 or the coordinate system associated with vehicle 102). Location characteristics may further relate to the direction or location of transmitters 104, 106 and 108 relative to a selected point of reference in the reference coordinate system. The term 'location characteristics' may also relate herein to the motion characteristics of transmitters 104, 106 and 108. Motion characteristics relate herein to the velocity and direction of motion of the transmitters 104, 106 and 108 (i.e., either relative to vehicle 102 or in a reference coordinate system) and may further relate to the acceleration of transmitters 104, 106 and 108.

The term 'transmission protocol' herein relates to the transmission characteristics of transmitters 104, 106 and 108. These transmission characteristics are, for example, the carrier frequency, the modulation scheme employed by transmitters 104, 106 and 108, symbol rate, the channel encoding scheme (e.g., convolution codes, Reed-Solomon codes and the like), multi-access allocation information (e.g., spreading/channelization codes, allocated time slots, allocated tones in OFDM, allocated frequency channels or any combination thereof), frame structure.

As mentioned above, system 100 determines the transmission characteristics of selected one or ones of transmitters 104, 106 and 108. To that end, system 100 requires information regarding the transmission protocol employed by transmitters 104, 106 and 108. In general, the transmission protocols of wireless networks, such as cellular networks or WiFi networks are known and published. However, in order to identify transmission characteristics of transmitters 104, 106 and 108, system 100 requires the multi-access allocation information of the selected ones of transmitters 104, 106 and 108. The multi-access allocation information of each of transmitters 104, 106 and 108, is transmitted by base station 110 over a control channel or channels (e.g., FACH channel in CDMA and AGCH channels in GSM) and received by each one of transmitters 104, 106 and 108. System 100 monitors this control channel or channels and determines the multi-access allocation information respective of each of transmitters 104, 106 and 108. The multi-access allocation information defines the respective transmission channel of each of transmitter 104, 106 and 108 for a specific transmission session (e.g., telephone call, messaging, data transmission). Thereafter, system 100 determines the transmission characteristics (e.g., transmission start time and transmission end time) of the selected one ore ones of transmitters 104, 106 and 108 as further explained below.

With reference to FIG. 1B, system 100 includes a receiving antenna array 120, a plurality of receivers $122_1$, $122_2, \ldots, 122_N$, a reference receiver 124, a reference antenna 136, a database 142 and a processor 126. Receiving antenna array 120 includes a plurality of dual polarized antennas $128_1, 128_2, \ldots, 128_N$, each including a respective horizontal polarization antenna $130_{1H}, 130_{2H}, \ldots, 130_{NH}$ and a respective vertically polarization antenna $130_{1E}, 130_{2E}, \ldots, 130_{NE}$. Each one of receivers $122_1, 122_2, \ldots, 122_N$ includes a respective horizontal polarization front-end $132_{1H}, 132_{2H}, \ldots, 132_{NH}$ and a respective vertical polarized front-end $132_{1E}, 132_{2E}, \ldots, 132_{NE}$. Each one of receivers $122_1, 122_2, \ldots, 122_N$ includes a respective horizontal polarization analog to digital converter (ADC) $134_{1H}, 134_{2H}, \ldots, 134_{NH}$ and a respective vertical polarized front-end $134_{1E}, 134_{2E}, \ldots, 134_{NE}$. Reference receiver 126 includes a reference front-end 138 and a reference ADC 140.

Each one of horizontal polarization front-end $132_{1H}, 132_{2H}, \ldots, 132_{NH}$ is coupled with a respective horizontal polarization antenna $130_{1H}, 130_{2H}, \ldots, 130_{NH}$ and with a respective horizontal polarization ADC $134_{1H}, 134_{2H}, \ldots, 134_{NH}$. Similarly, each one of vertically polarization front-end $132_{1E}, 132_{2E}, \ldots, 132_{NE}$ is coupled with a respective vertically polarization antenna $130_{1E}, 130_{2E}, \ldots, 130_{NE}$ and with a respective vertically polarization ADC $134_{1E}$, $134_{2E}, \ldots, 134_{NE}$. Each one of horizontal polarization ADC $134_{1H}, 134_{2H}, \ldots, 134_{NH}$ and vertically polarization ADC $134_{1E}, 134_{2E}, \ldots, 134_{NE}$ is further coupled with processor 126. Reference front end 138 is coupled with reference antenna 136 and with reference ADC 140. Reference ADC 140 is further coupled with processor 126. Processor 126 is further coupled with database 142.

As mentioned above, to determine the transmission characteristics of selected one or ones of transmitters 104, 106 and 108, system 100 needs to determine the multi-access allocation information respective of the selected one of transmitters 104, 106 and 108. To that end, reference antenna 136 receives the signal transmitted by base station 110 and produces a reference electric received signal. Reference antenna 136 provides the received signal produced thereby to reference front-end 138. Reference front-end 138 filters, amplifies and down converts the reference received signals and produces an intermediate reference received signal. This intermediate reference received signal may be a complex signal which includes an in-phase signal and a quadrature signal. Reference front-end 138 provides the intermediate reference received signal produced thereby to reference ADC 140, which samples the intermediate reference received signal and provides the sampled reference received signal produced thereby to processor 126. Similar to the intermediate reference received signal, sampled reference received signal may be a complex signal which includes an in-phase signal and a quadrature signal. Processor 126 processes the sampled received signal to decode the transmission received from base station 110. Specifically, processor 126 decodes the transmission over the control channels of the protocol employed by base station 110 and transmitters 104, 106 and 108 (e.g., FACH in CDMA and AGCH in GSM and the like) to determine the multi-access information associated with transmitters 104, 106 and 108. For example, processor 126 associates the received multi-access information and with respective unique identifications (e.g., International Mobile Station Equipment Identity—IMEI, or International Mobile Subscriber Identity—IMSI) respective of each one of transmitters 104, 106 and 108. Processor 126 may store the multi-access information associated with transmitters 104, 106 and 108 in database 142.

Once system 100 determines multi-access information associated with the selected one or ones of transmitters 104, 106 and 108, system 100 can detect the transmissions the selected ones of transmitters 104, 106 and 108. To that end each one of horizontal polarization antenna $130_{1H}$, $130_{2H}, \ldots, 130_{NH}$ and a vertically polarization antenna $130_{1E}, 130_{2E}, \ldots, 130_{NE}$ receives the signal transmitted by transmitters 104, 106 and 108 and transforms the signal and produces an electrical received signal. Each one of horizontal polarization antenna $130_{1H}, 130_{2H}, \ldots, 130_{NH}$ and a vertically polarization antenna $130_{1E}, 130_{2E}, \ldots, 130_{NE}$ provides the received signal produced thereby to the respective one of horizontal polarization front-end $132_{1H}$, $132_{2H}, \ldots, 132_{NH}$ and vertically polarization front-end $132_{1E}, 132_{2E}, \ldots, 132_{NE}$. Each horizontal polarization front-end $132_{1H}, 132_{2H}, \ldots, 132_{NH}$ and vertically polarization front-end $132_{1E}, 132_{2E}, \ldots, 132_{NE}$ filters, amplifies and optionally de-spreads and down converts the received signals and produces an intermediate received signal in accordance with the known pertinent transmission protocol. These intermediate received signals may be a complex signals which includes an in-phase signal and a quadrature signal. Each horizontal polarization front-end $132_{1H}$, $132_{2H}, \ldots, 132_{NH}$ and vertically polarization front-end $132_{1E}, 132_{2E}, \ldots, 132_{NE}$ provides the intermediate received signal produced thereby to the respective one of horizontal polarization ADC $134_{1H}, 134_{2H}, \ldots, 134_{NH}$ and vertically polarization ADC $134_{1E}, 134_{2E}, \ldots, 134_{NE}$, which samples the respective intermediate received signals provide thereto (i.e., also according to the known pertinent transmission protocol) and produce a respective horizontal polarization and vertical polarization sampled received signal. Similar to the intermediate received signals, these sampled received signals may be complex signals which include an in-phase signal and a quadrature signal. Each one of horizontal polarization ADC $134_{1H}, 134_{2H}, \ldots, 134_{NH}$ and vertically polarization ADC $134_{1E}, 134_{2E}, \ldots, 134_{NE}$ provides the respective sampled received signal produced thereby to processor 126. It is noted that, when supporting multiple protocols, processor 126 may control the filtering, amplification, de-spreading and down conversion as well as the sampling of the signals to conform to the pertinent protocol.

To identify the transmission characteristics (e.g., transmission start time, transmission end time, volume of transmitted data, transmission duration) of the selected one or ones of transmitters 104, 106 and 108, processor 126 identifies the unique identification associated with the selected one or ones of transmitters 104, 106 and 108 and retrieves the multi-access information associated with this unique identification from database 142 (i.e., according to the transmission over the control channels of the protocol employed by base station 110). Processor 126 then employs the respective multi-access information associated with the selected one or ones of transmitters 104, 106 and 108 to determine the transmission characteristics thereof.

To determine the transmission start time and transmission end time, processor 126 monitors the transmission channel respective of the selected one or ones of transmitters 104, 106 and 108 (i.e., as defined by the respective multi-access allocation information) and employs internal time tags to determine when the selected transmitters commenced and ceased transmission. The transmission duration may be determined from the difference between these internal time tags. To determine the volume of data transmitted, processor 126 employs, for example, the multi-access information and the frame structure of the known transmission protocol to determine the number of frames transmitted by the selected one or ones of transmitters 104, 106 and 108 and thereby determining the volume of data transmitted by the selected transmitters. Alternatively, when TDMA is employed, processor 126 may determine the volume of data by determining the number of slots the selected transmitters employed. For example, in General Packet Radio Service (GPRS), employing Coding Scheme (CS)-1, the data rate per slot is approximately 9 kbs (nine kilobits per second). The time duration of each slot is 576.92 microseconds (μs). By employing the data rate per time slot and counting the number of slots each selected transmitter employs and the duration of each slot, processor 126 determines the volume of data transmitted and optionally the transmission duration. It is noted that, according to the disclosed technique and with regards to the cellular network example, the transmission characteristics of the selected transmitter or transmitters are determined from the Air Interface of the network. In other words, according to the disclosed technique, the backhaul of the network is not monitored only the Radio Frequency (RF) transmissions.

As mentioned above, one of the usage characteristics of a transmitter include the location characteristics of that transmitter. To determine the location characteristics of the selected one or ones of transmitters 104, 106 and 108, system 100 employs antenna array 120. In the example brought forth in FIGS. 1A and 1B, system 100 is located on vehicle 102 such as an aircraft, while transmitters 104, 106 and 108 are generally located on the ground. As such, antenna array 120 is a two-dimensional array enabling to determine the azimuth and elevation of the selected one or ones of transmitters 104, 106 and 108 relative to vehicle 102.

When, for example, transmission detection system 100 is located on an aircraft and transmitters 104, 106 and 108 are located on the ground, the signals received by system 100 may exhibit an unknown polarization regardless of the polarization in which the signals where transmitted. To determine the location characteristics of the selected one or ones of transmitters 104, 106 and 108, when the polarization of the received signal is unknown, processor 126 employs the horizontal polarization and vertical polarization sampled received signals resulting from the signal received by each one of duel polarized antennas polarized antennas 128$_1$, 128$_2$, ..., 128$_N$. For each of horizontal polarization antenna 130$_{1H}$, 130$_{2H}$, ..., 130$_{NH}$ and a vertically polarization antenna 130$_{1E}$, 130$_{2E}$, ..., 130$_{NE}$, processor 126 sums the horizontal polarization and vertical polarization sampled received signals from each of receivers 122$_1$, 122$_2$, ..., 122$_N$ and determines the Direction OF Arrival (DOA) of the signal or signals received from the selected one or ones of transmitters 104, 106 and 108. In general, a signal received by an antenna array is given by:

$$y(t) = \overline{w_{x,y}}^T x(t) \quad (1)$$

where x(t) is a vector of the summed horizontal polarization and vertical polarization sampled received signals and $\overline{w_{x,y}}$ is the steering vector of the array given by:

$$\overline{w}_{x,y} = \begin{bmatrix} a_1 e^{j\phi(\theta,\varphi)_1} \\ a_2 e^{j\phi(\theta,\varphi)_2} \\ a_3 e^{j\phi(\theta,\varphi)_3} \\ \vdots \\ a_N e^{j\phi(\theta,\varphi)_N} \end{bmatrix} \quad (2)$$

where N is the number of receiver antennas, $a_i e^{j\phi(\theta,\varphi)i}$ is the complex representation (i.e., amplitude and phase) of the signal received by the $i^{th}$ receiver relative to a reference signal. The phase $\phi(\theta,\varphi)$ of the received signal is a function of the azimuth, $\theta$, and the elevation, $\varphi$, from which the signal was received. When the signal received by the $i^{th}$ receptors is employed as the reference signal than $a_i e^{j\phi(\theta,\varphi)i}$.

In general, finding the DOA relates to finding the azimuth, $\theta$, and elevation, $\varphi$, maximizing the received signal, y(t), as follows:

$$[\theta, \varphi] = \underset{\theta,\varphi}{\mathrm{argmax}}\, y(t) \quad (3)$$

This optimization problem may be solved by any known in the art techniques such as Least Mean Squares (LMS). Alternatively, this optimization problem may be solved by correlation based techniques such as beamforming, Multiple Signal Classification (MUSIC), Estimation of Signal Parameters via Rotational Invariance Techniques (ESPRIT), Capon's minimum variance and the like, which employ the autocorrelation matrix between each of the summed horizontal polarization and vertical polarization sampled received signals.

According to another example, the azimuth and elevation of the selected ones of transmitters 104, 106 and 108 relative to vehicle 102, processor 126 employs the Poynting direction finding technique as follows:

$$p \stackrel{def}{=} \begin{bmatrix} p_x \\ p_y \\ p_z \end{bmatrix} = \frac{e \times h^*}{\|e\| \cdot \|h\|} = \begin{bmatrix} \sin\theta\cos\phi \\ \sin\theta\sin\phi \\ \cos\theta \end{bmatrix} \quad (4)$$

where e represents the electrical field received signal h represents magnetic field the horizontal polarization received signal, $\theta$ represents the azimuth and $\phi$ represent the elevation x represents the cross product operation, · is the dot product operator and $\|\cdot\|$ is the magnitude operator.

The accuracy of the location characteristics of the selected transmitters may be affected by deformation of the antenna array employed to determine this location characteristics. In general, antennas such as antennas 128$_1$, 128$_2$, ..., 128$_N$ in antenna array 120 may not be located at the designed relative position therebetween. Furthermore, when antenna array 120 is in motion (e.g., during flight of aircraft 102), antenna array 120 may suffer from deformations, which shall also dislocate antennas 128$_1$, 128$_2$, ..., 128$_N$ from their relative position (i.e., at least temporarily). As such, when transmission detection system 100 determines the location characteristics of the selected one or ones of transmitters 104, 106 and 108, the determined location characteristics may be erroneous. In order to attempt and alleviate these errors, prior to determining location properties, transmission detection system 100 determines correction factors for the signals received from each of antennas 128$_1$, 128$_2$, ..., 128$_N$. To that end, transmission detection system 100 employs a plurality of calibration stations, which are transmitters (i.e., different from transmitters 104, 106 and 108) located at known locations relative to system 100. As such, the predicted signals difference, $\Delta\Phi_p$, between the signals received from each of antennas 128$_1$, 128$_2$, ..., 128$_N$ can be determined. Also, the actual signals difference, $\Delta\Phi_m$, between the signals received from each of antennas 128$_1$, 128$_2$, ..., 128$_N$ is measured. A correction factor is then determined according to the predicted signals differences and the actual (i.e., measured) signal difference for each antenna. For example, the ratio between the measured signals difference and the predicted signals difference respective of the signals received from the plurality of calibration stations, serves as a correction factor for each signals difference measurement when determining the location characteristics of the selected one or ones of transmitters 104, 106 and 108. It is noted that the term 'signals difference' relates herein either to the phase difference between the received signals or to the differences between the complex received signals.

Figure 2:
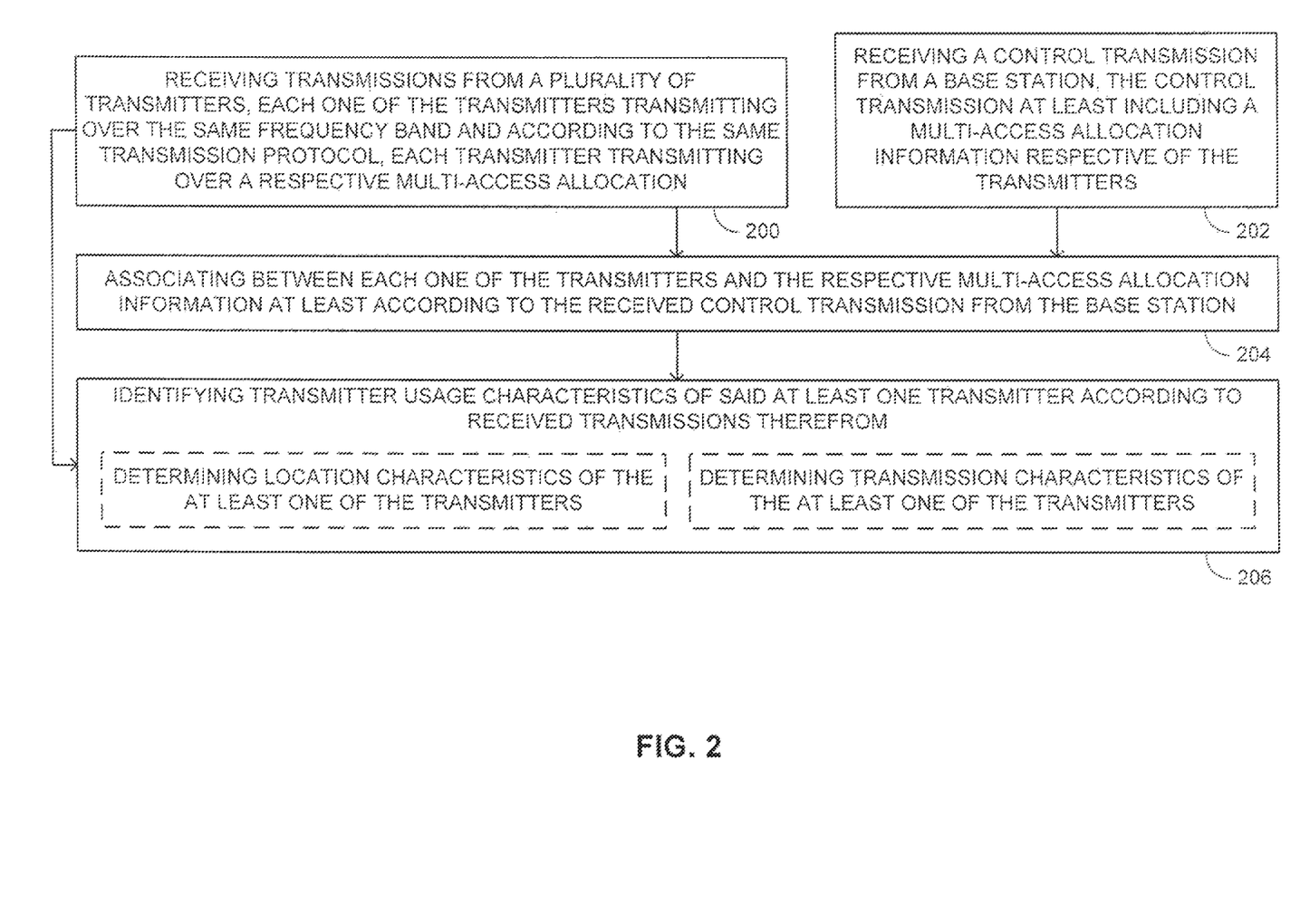
FIG. 2 is a schematic illustration of a method of transmission detection, operative in accordance with another embodiment of the disclosed technique.

Reference is now made to FIG. 2, which is a schematic illustration of a method for determining transmitter usage characteristics, operative in accordance with another embodiment of the disclosed technique. In procedure 200, transmissions from a plurality of transmitters are received. Each one of the transmitters transmits over the same frequency band and according to the same transmission protocol. Each one of the transmitters transmits over a respective multi-access allocation. With reference to FIGS. 1A and 1B, system 100 receives transmissions from transmitters 104, 106 and 108. Each one of the transmitters 104, 106 and 108 transmits over the same frequency band, according to the same transmission protocol and over a respective multi-access allocation. After procedure 200, the method proceeds to procedure 202 and to procedure 206.

In procedure 202, a control transmission is received from a base station. This base station may be, for example, a base station of a cellular network or a WiFi router. The control transmission includes multi-access information (i.e., TDMA time slots FDMA frequency CDMA spreading codes or any combination thereof) employed by the pertinent protocol. The multi-access information is transmitted over a control channel or channels (e.g., FACH channel in CDMA and AGCH channels in GSM). The multi-access allocation information defines the respective transmission channel of each transmitter for a specific transmission session (e.g., telephone call, messaging, data transmission). With reference to FIGS. 1A and 1B, system 100 receives the multi-access allocation information respective of each of transmitters 104, 106 and 108, transmitted by base station 110 over a control channel or channels of the pertinent protocol.

In procedure 204, each one of the transmitters is associated with the respective multi-access allocation information at least according to the received control transmission from the base station. For example, the multi-access information is associated with respective unique identifications (e.g., International Mobile Station Equipment Identity—IMEI, or International Mobile Subscriber Identity—IMSI) of each one of transmitters. With reference to FIGS. 1A and 1B, processor 126 associates between each one of the transmitters and the respective multi-access allocation information of each one of transmitters 104, 106 and 108.

In procedure 206, transmitter usage characteristics of at least one selected transmitter are identified according to received transmission therefrom. The transmitter usage characteristics include, for example, transmitter location characteristics, and transmission characteristics. Transmission characteristics at least include the transmission start time and the transmission end time and may further include transmission duration and the volume of transmitted data (e.g., measured in bytes). Location characteristics relate to the direction of the transmitters relative to the vehicle and may further relate to the location of the transmitters relative to the vehicle. Location characteristics may also refer to the location of the transmitters in a reference coordinate system. The location characteristics may further relate herein to the motion characteristics (e.g., velocity, direction of motion or acceleration) of the transmitters. With reference to FIGS. 1A and 1B, processor 126 identifies the transmitter usage characteristics of the selected one of ones of transmitters 104, 106 and 108.

It will be appreciated by persons skilled in the art that the disclosed technique is not limited to what has been particularly shown and described hereinabove. Rather the scope of the disclosed technique is defined only by the claims, which follow.

The invention claimed is:

1. A method for identifying transmitter usage characteristics of at least one transmitter of a plurality of transmitters, the method comprising the procedures of:

receiving, by an array of dual polarized antennas in a transmitter detection system, transmissions from the plurality of transmitters, each one of said transmitters transmitting over a same frequency band and according to a same transmission protocol, each one of said transmitters being associated with unique multi-access information;

receiving, by a reference antenna in said transmitter detection system, a control transmission from a base station, said base station employing said transmission protocol, said control transmission at least including a plurality of unique multi-access information respective of said transmitters;

associating, by a processor in said transmitter detection system, between each one of said transmitters and the respective unique multi-access information; and identifying, by said processor, said transmitter usage characteristics of said at least one transmitter according to a received transmission from said at least one transmitter, said transmitter usage characteristics including transmitter location characteristics and transmission characteristics, said transmission characteristics include at least one of:
transmission start time;
transmission end time;
transmission duration; and
volume of transmitted data;

wherein said transmitter location characteristics include at least one of:
a direction of said at least one transmitter relative to said array of dual polarized antennas;
a location of said at least one transmitter in a reference coordinate system;
a direction of said at least one transmitter to a selected point of reference in the reference coordinate system;
a location of said at least one transmitter relative to said selected point of reference in the reference coordinate system; and
motion characteristics of said at least one transmitter.

2. The method according to claim 1, wherein said motion characteristics relate to at least one of:
a velocity of said at least one transmitter;
a direction of motion of said at least one transmitter; and
an acceleration of said at least one transmitter.

3. The method according to claim 1, further including a preliminary procedure of calibrating said array of dual polarized antennas including the sub-procedures of:

receiving, by said array of dual polarized antennas, transmissions from calibration stations, located at known locations;

predicting, by said processor, signal differences between signals received from each of the antennas in said array of dual polarized antennas;

measuring, by said processor, actual signal differences between the signals received each antenna in said array of dual polarized antennas; and determining, by said processor, a correction factor according to said predicted signal differences and said actual signal differences.

4. A system for identifying transmitter usage characteristics of at least one transmitter of a plurality of transmitters, the system comprising:

an antenna array including a plurality of dual polarized antennas, each antenna in said antenna array receiving signals transmitted by the plurality of transmitters, each one of said transmitters transmitting over a same frequency band and according to a same transmission protocol, each one of said transmitters being associated with unique multi-access information;

a reference antenna receiving a signal from a base station, said base station employing said transmission protocol, said signal from said base station including a control transmission, said control transmission including said unique multi-access information respective of said transmitters;

a plurality of receivers, each coupled with a respective dual polarized antenna in said antenna array, each receiving a respective electric received signal from the respective dual polarized antenna, producing a respective sampled received signal;

a reference receiver coupled with said reference antenna, receiving from said reference antenna said reference electric received signal from said reference antenna and producing a sampled reference received signal;

a processor coupled with each one of said plurality of receivers and with said reference receiver, receiving said sampled reference received signal from said reference receiver and a plurality of sampled received signals from said receivers, said processor determining multi-access information respective of each of said transmitters from said sampled reference received signal, said processor associating between each one of said transmitters and the respective multi-access information, said processor further identifying said transmitter usage characteristics of said at least one transmitter according to a received transmission from said at least one transmitter, said transmitter usage characteristics including transmitter location characteristics and transmission characteristics, said transmission characteristics includes at least one of:

transmission start time;
transmission end time;
transmission duration; and
volume of transmitted data;

wherein said transmitter location characteristics include at least one of:
 a direction of said at least one transmitter;
 a location of said at least one transmitter in a reference coordinate system;
 a direction of said at least one transmitter to a selected point of reference in the reference coordinate system;
 a location of said at least one transmitter relative to said selected point of reference in the reference coordinate system; and
 motion characteristics of said at least one transmitter.

5. The system according to claim 4, wherein said motion characteristics relate to at least one of:
 a velocity of said at least one transmitter;
 a direction of motion of said at least one transmitter; and
 an acceleration of said at least one transmitter.

\* \* \* \* \*